US010208890B1

(12) United States Patent
Rockhill

(10) Patent No.: US 10,208,890 B1
(45) Date of Patent: *Feb. 19, 2019

(54) SUPPORT FRAME

(71) Applicant: Jeffrey A. Rockhill, Lebanon, TN (US)

(72) Inventor: Jeffrey A. Rockhill, Lebanon, TN (US)

(*) Notice: Subject to any disclaimer, the term of this patent is extended or adjusted under 35 U.S.C. 154(b) by 12 days.

This patent is subject to a terminal disclaimer.

(21) Appl. No.: 15/713,874

(22) Filed: Sep. 25, 2017

Related U.S. Application Data

(63) Continuation of application No. 15/159,851, filed on May 20, 2016, now Pat. No. 9,803,798.

(60) Provisional application No. 62/164,680, filed on May 21, 2015.

(51) Int. Cl.
| | |
|---|---|
| *A47C 9/10* | (2006.01) |
| *A47C 1/00* | (2006.01) |
| *A01K 97/10* | (2006.01) |
| *F16M 13/02* | (2006.01) |
| *A47B 37/04* | (2006.01) |
| *A47C 1/14* | (2006.01) |
| *F16M 11/24* | (2006.01) |
| *A47C 4/03* | (2006.01) |

(52) U.S. Cl.
CPC ............ *F16M 13/02* (2013.01); *A47B 37/04* (2013.01); *A47C 1/14* (2013.01); *F16M 11/24* (2013.01); *A01K 97/10* (2013.01); *A47C 4/03* (2013.01); *A47C 9/10* (2013.01)

(58) Field of Classification Search
CPC .......... F16M 13/02; F16M 11/24; A47C 1/04; A47C 9/10; A47C 4/02; A47C 4/03; A47C 1/14; A01K 97/10; A47B 37/04

USPC ...... 248/239.1, 150, 156, 161, 188.5, 188.8, 248/345

See application file for complete search history.

(56) References Cited

U.S. PATENT DOCUMENTS

| | | | |
|---|---|---|---|
| 401,302 A | 4/1889 | Purdy | |
| 546,161 A | 9/1895 | Kimball | |
| 872,410 A | 12/1907 | Grannis | |
| 1,218,357 A | 3/1917 | Bauer | |
| 1,956,956 A | 5/1934 | Leibo | |
| 2,607,398 A | 8/1952 | Andrews | |
| 2,607,648 A | 8/1952 | Metcalf | |
| 2,720,249 A * | 10/1955 | Peterson | A47C 9/10 108/141 |

(Continued)

FOREIGN PATENT DOCUMENTS

CN       2137431 Y     7/1993

*Primary Examiner* — Tan Le
(74) *Attorney, Agent, or Firm* — Patterson Intellectual Property Law, P.C.; Gary L. Montle

(57) ABSTRACT

A support frame is provided to be mounted to one or more support platforms having respective holes defined therein. The support frame comprises an elongate rigid column having a longitudinal axis extending from a proximal end to a distal end opposite the proximal end, at least the distal end and an associated portion of the elongate rigid column configured to extend through the one or more support platform holes. A platen bracket is connected to the elongate rigid column nearer the proximal end than the distal end, and a support platen is connected to the platen bracket. At least one flange is positioned along the elongate rigid column nearer the distal end than the proximal end, and extends transversely from the longitudinal axis of the elongate rigid column. The one or more flanges are configured to interface with at least one of the one or more support platforms.

20 Claims, 14 Drawing Sheets

(56) References Cited

U.S. PATENT DOCUMENTS

| | | | |
|---|---|---|---|
| 2,877,828 A | 3/1959 | Barnette, Jr. | |
| 3,111,123 A * | 11/1963 | Le Fort | A47J 37/0772 |
| | | | 108/141 |
| 3,178,142 A | 4/1965 | Koch | |
| 3,283,733 A | 11/1966 | Boerma | |
| 3,568,963 A | 3/1971 | Koskinen | |
| 3,834,370 A * | 9/1974 | Nelson | A47J 37/0772 |
| | | | 126/25 A |
| 4,008,500 A | 2/1977 | Hall, Jr. | |
| 4,221,014 A | 9/1980 | Davidson | |
| 4,234,989 A | 11/1980 | Pearcy | |
| 4,279,398 A | 7/1981 | Pregnall | |
| 4,318,567 A * | 3/1982 | Guthier | A47C 15/004 |
| | | | 135/16 |
| 4,582,287 A | 4/1986 | DeLeary | |
| 4,587,921 A * | 5/1986 | Currey | B63B 29/04 |
| | | | 114/253 |
| 4,928,620 A | 5/1990 | Currey | |
| 4,977,848 A | 12/1990 | Currey | |
| 4,979,458 A | 12/1990 | Bouza | |
| 5,035,186 A | 7/1991 | Uredat et al. | |
| 5,056,746 A | 10/1991 | Parsons et al. | |
| 5,110,184 A | 5/1992 | Stein et al. | |
| 5,120,016 A * | 6/1992 | Dysarz | A01K 97/10 |
| | | | 248/222.13 |
| 5,685,517 A | 11/1997 | Salibra | |
| 5,961,091 A | 10/1999 | Petryna et al. | |
| 5,967,075 A * | 10/1999 | Johansen | A47B 23/02 |
| | | | 114/218 |
| 6,003,826 A | 12/1999 | Galloway, III | |
| 6,308,468 B1 | 10/2001 | Caruso | |
| 6,705,240 B2 | 3/2004 | Block et al. | |
| 6,869,245 B2 | 3/2005 | Cabiran | |
| 6,938,871 B1 | 9/2005 | Carlson | |
| 7,201,442 B1 * | 4/2007 | Decosta, Jr. | A47C 7/66 |
| | | | 135/16 |
| 7,575,215 B1 * | 8/2009 | Clark | A01K 97/10 |
| | | | 248/222.11 |
| 9,301,621 B2 * | 4/2016 | Barstad | A47C 4/022 |
| 10,059,407 B1 * | 8/2018 | Ingalls | B63B 17/02 |
| 2009/0211563 A1 | 8/2009 | Blackshear et al. | |
| 2015/0090857 A1 | 4/2015 | Walker | |

\* cited by examiner

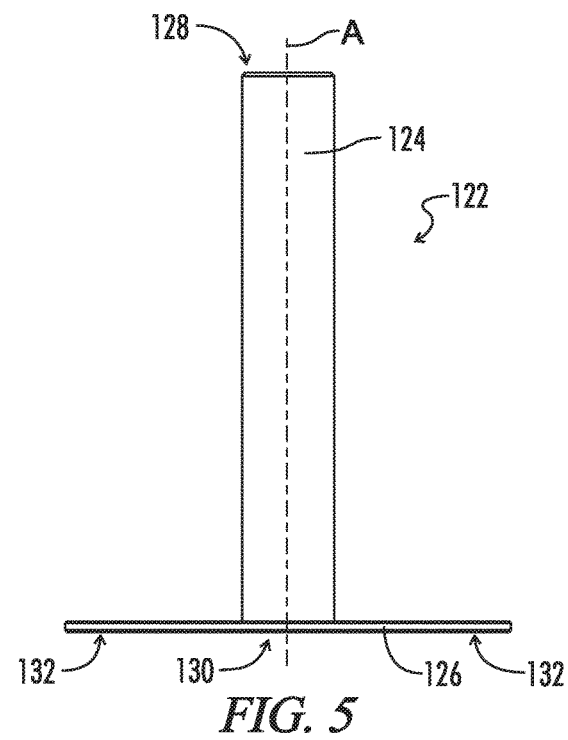
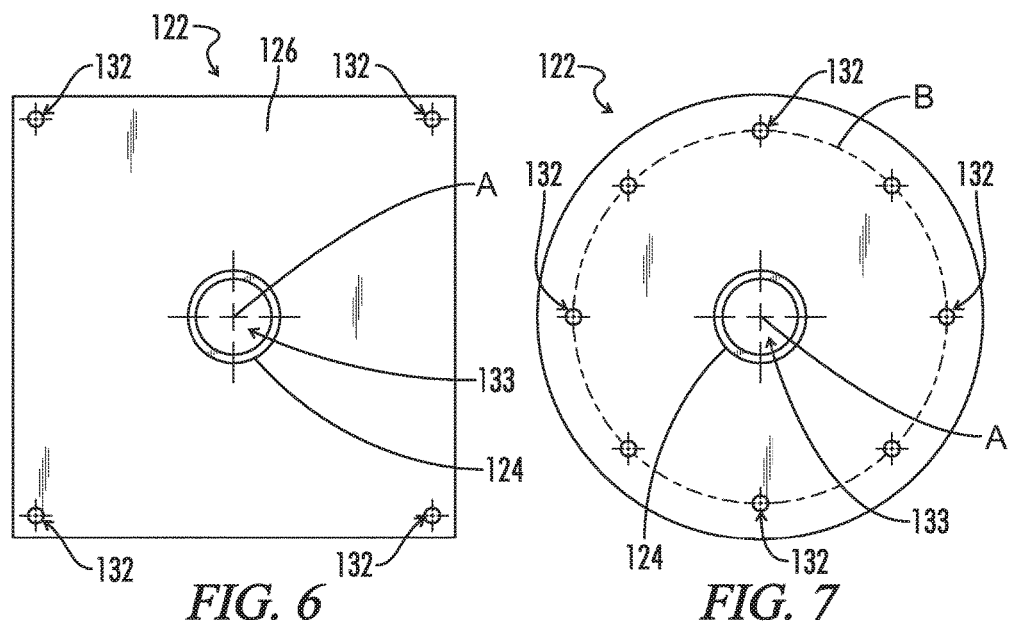
FIG. 5
FIG. 6
FIG. 7

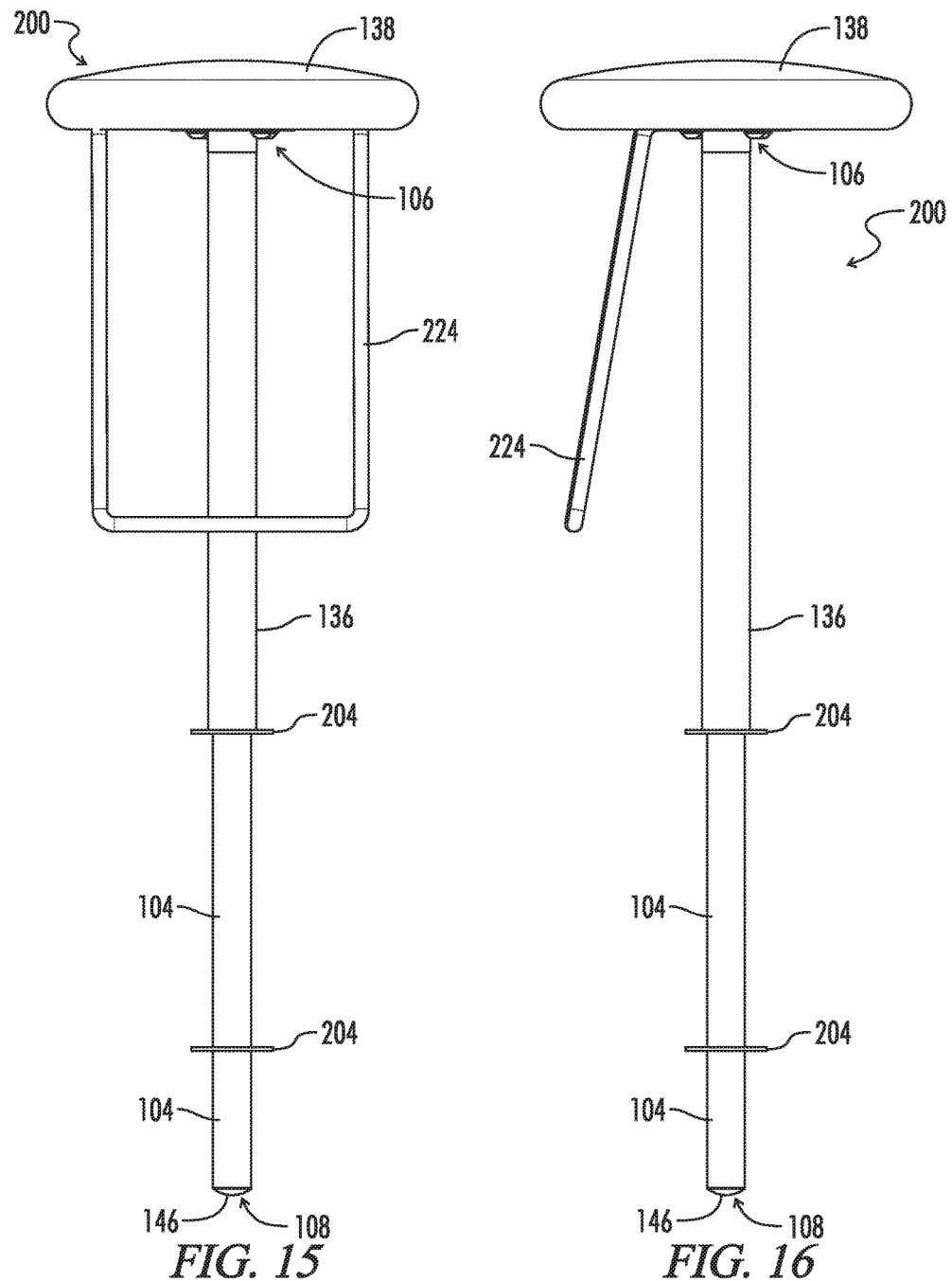

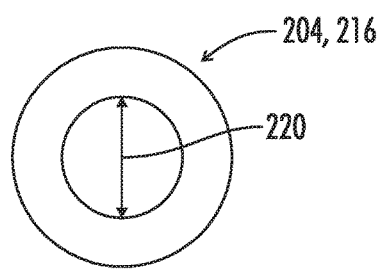 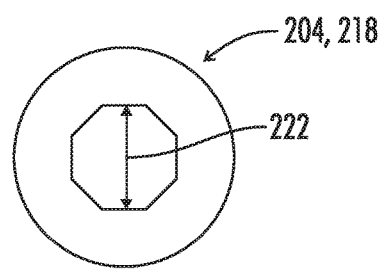
*FIG. 18*  *FIG. 19*
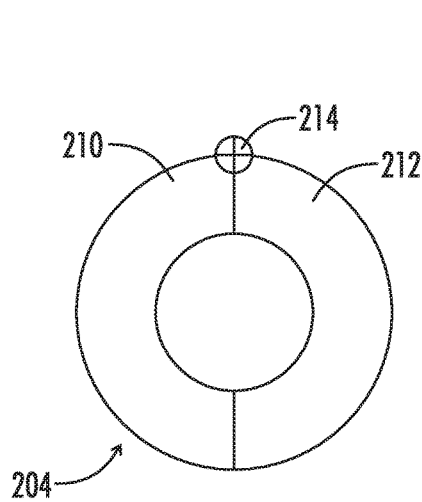 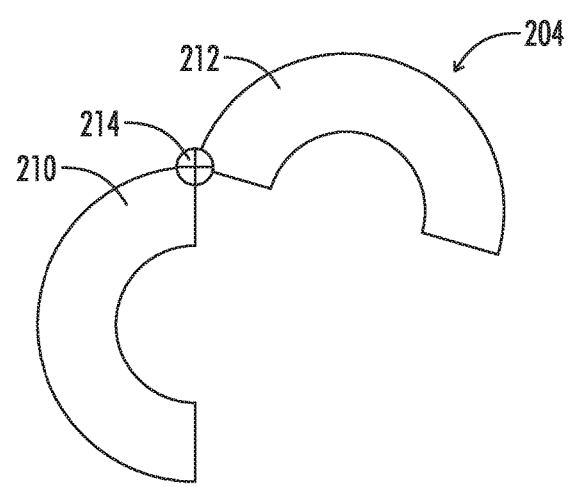
*FIG. 20*  *FIG. 21*

SUPPORT FRAME

CROSS-REFERENCES TO RELATED APPLICATIONS

This application is a continuation of U.S. patent application Ser. No. 15/159,851, filed May 20, 2016, and further claims benefit of U.S. Provisional Application Ser. No. 62/164,680, filed May 21, 2015, and which is hereby incorporated by reference.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

The present disclosure relates generally to a support frame. More particularly, the present disclosure pertains to a support frame that may be disposed on or within a support platform including, but not limited to, a deck or patio structure.

While a deck or patio may be a common gathering place for entertaining large groups of people, seating or table space is often limited. Traditional patio furniture may be added, but such furniture can quickly create an unsightly and cluttered appearance. Moreover, it presents various storage and maintenance problems for homeowners. If the additional furniture is to be normally kept away from the deck, the homeowner must dedicate a great deal of space to storage. If the additional furniture is merely kept on the deck, the homeowner must be wary of it being damaged by natural elements such as wind and rain.

Therefore, what is needed is a support frame that may be quickly added to a new or existing planar support platform.

It may be further desirable that at least a portion of the support frame be easily storable and unobtrusive.

It may be even further desirable that the support frame be securely attached to the new or existing planar support platform and be capable of enduring repeated exposure to wind and moisture.

BRIEF SUMMARY

Briefly, the present disclosure relates, in one embodiment, to a support frame to be mounted to a corresponding support platform. The support frame may include an elongate rigid column. The elongate rigid column may include a proximal end and a distal end opposite the proximal end. A platen bracket may be connected to the elongate rigid column nearer the proximal end than the distal end. A support platen may be connected to the platen bracket. A flanged sleeve may be coaxially received on the elongate rigid column nearer the distal end than the proximal end. The flanged sleeve may include a sleeve portion slidably received on the elongate rigid column. The flanged sleeve may further include a mounting flange extending from the sleeve portion. The mounting flange may be configured to interface with the support platform. A guide sleeve may be coaxially received on the elongate rigid column between the platen bracket and the flanged sleeve. The guide sleeve may be configured to maintain the platen bracket and the flanged sleeve in a spaced apart orientation when the support frame is mounted to the corresponding support platform.

An alternative embodiment may include the flanged sleeve further including a free end and a flange end opposite the free end, the mounting flange extending radially from the sleeve portion at the flange end.

Still another embodiment includes the flanged sleeve received on the elongate rigid column with the flange end of the flanged sleeve nearer the proximal end of the elongate rigid column than the free end of the flanged sleeve.

Yet another embodiment includes the flanged sleeve received on the elongate rigid column with the free end of the flanged sleeve nearer the proximal end of the elongate rigid column than the flange end of the flanged sleeve.

Another embodiment includes the mounting flange including a plurality of holes configured to receive fasteners therethrough.

A further embodiment includes a backing plate configured to be located on the support platform opposite the mounting flange and including a plurality of holes configured to receive fasteners extending through the plurality of holes in the mounting flange.

A further still embodiment includes the guide sleeve and the sleeve portion of the flanged sleeve including cylindrical sleeves with common inner and outer diameters.

Yet another embodiment includes the support platen including a seat connected thereto.

Still another embodiment includes the support platen including a table platform connected thereto.

The present disclosure also relates, in one embodiment, to a support frame. The support frame may include a support platform defining a hole therein. The support platform may also include an upper face and a lower face. An elongate rigid column may include a proximal end and a distal end opposite the proximal end. The distal end may be received through the hole of the support platform and extend beyond the lower face. At least one mounting flange may be connected to the elongate rigid column nearer the distal end than the proximal end. The at least one mounting flange may also be mounted to at least one of the upper face and the lower face. A platen bracket may be connected to the elongate rigid column nearer the proximal end than the distal end. A support platen may be connected to the platen bracket. A guide sleeve may be coaxially received on the elongate rigid column between the radial flange and the platen bracket. The guide sleeve may be arranged to resist a force to move the proximal end of the elongate rigid column toward the support platform.

A further embodiment includes a backing plate received on one of the upper face and the lower face opposite the mounting flange and fastened to the mounting flange.

Another embodiment includes the support platen including a table top.

An even further embodiment includes the support platen including a seat cushion.

One embodiment includes the at least one mounting flange removably connected to the elongate rigid column.

A further embodiment includes the guide sleeve including a rigid cylindrical sleeve.

The present disclosure also relates, in an embodiment, to a method of installing a support frame on a support platform. The method may include: inserting a sleeve portion of a flanged sleeve in a corresponding hole in the support platform such that a mounting flange extending from the sleeve portion contacts a face of the support platform; sliding a guide sleeve onto an elongate rigid column of the support frame; and inserting a distal end of the elongate rigid column into the sleeve portion of the flanged sleeve, thereby confining the guide sleeve between the flanged sleeve and a proximal end of the elongate rigid column.

A further still embodiment includes affixing the flanged sleeve to the support platform with fasteners received through corresponding holes defined in the mounting flange.

An even further embodiment includes extending the fasteners through the corresponding holes in the mounting flange, through the support platform, and through corresponding holes in a backing plate, thereby compressing the support platform between the mounting flange and the backing plate.

Another embodiment includes the guide sleeve resisting a force pushing the proximal end of the elongate support column toward the support platform.

Still another embodiment includes slidably removing the elongate support column to store the elongate support column and guide sleeve, leaving the flanged sleeve mounted to the support platform.

BRIEF DESCRIPTION OF THE DRAWINGS

FIG. 5 is a side elevation cross-section view of the flanged sleeve of the support frame of FIG. 1.

FIG. 6 is a top plan view of one embodiment of the flanged sleeve of FIG. 5.

FIG. 7 is a top plan view of another embodiment of the flanged sleeve of FIG. 5.

FIG. 15 is a front elevation view of the support frame of FIG. 10 including a foot rest.

FIG. 16 is a side elevation view of the support frame of FIG. 15.

FIG. 18 is a top plan view of an embodiment of a flange of the support frame of FIG. 10.

FIG. 19 is a top plan view of another embodiment of a flange of the support frame of FIG. 10.

FIG. 20 is a top plan view of another embodiment of a flange of the support frame of FIG. 10 in a closed configuration.

FIG. 21 is a top plan view of the flange of FIG. 20 in an open configuration.

DETAILED DESCRIPTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected", "attached", "joined", and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

Figure 1:
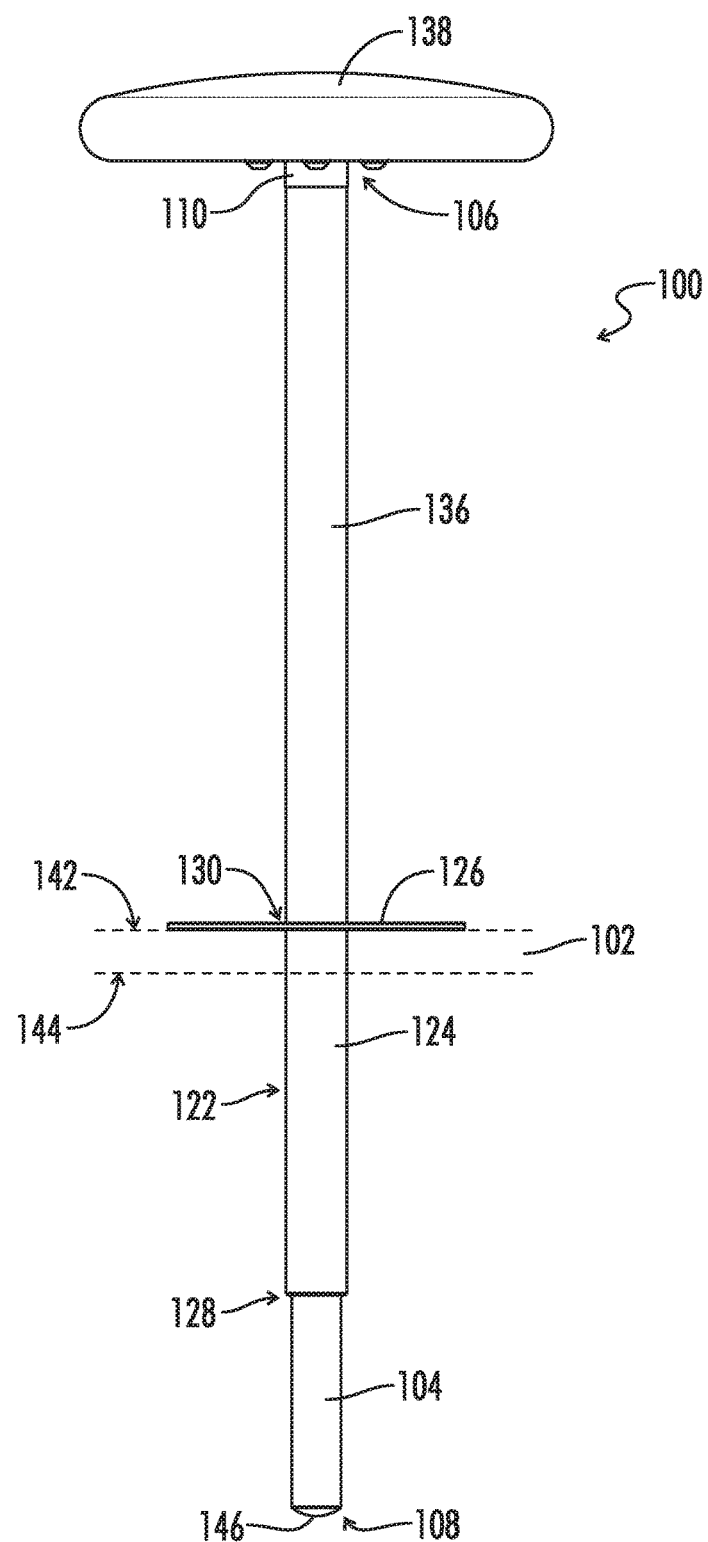
FIG. 1 is a side elevation view of one embodiment of a support frame.

Referring to FIG. 1, a first embodiment of a support frame 100 is shown. The support frame 100 may be configured to be mounted to a corresponding support platform 102 through a hole in the support platform. The support frame 100 may include an elongate rigid column 104. The elongate rigid column 104 may extend along a longitudinal axis A and may include a proximal end 106 and a distal end 108 opposite the proximal end.

A platen bracket 110, or any other plate or bracket of appropriate construction, may be connected to the elongate rigid column 104 nearer the proximal end 106 than the distal end 108. In some embodiments, one or more concentric bearing collars may be positioned between the elongate rigid column 104 and the platen bracket 110, and may facilitate rotation there between.

Figure 3:
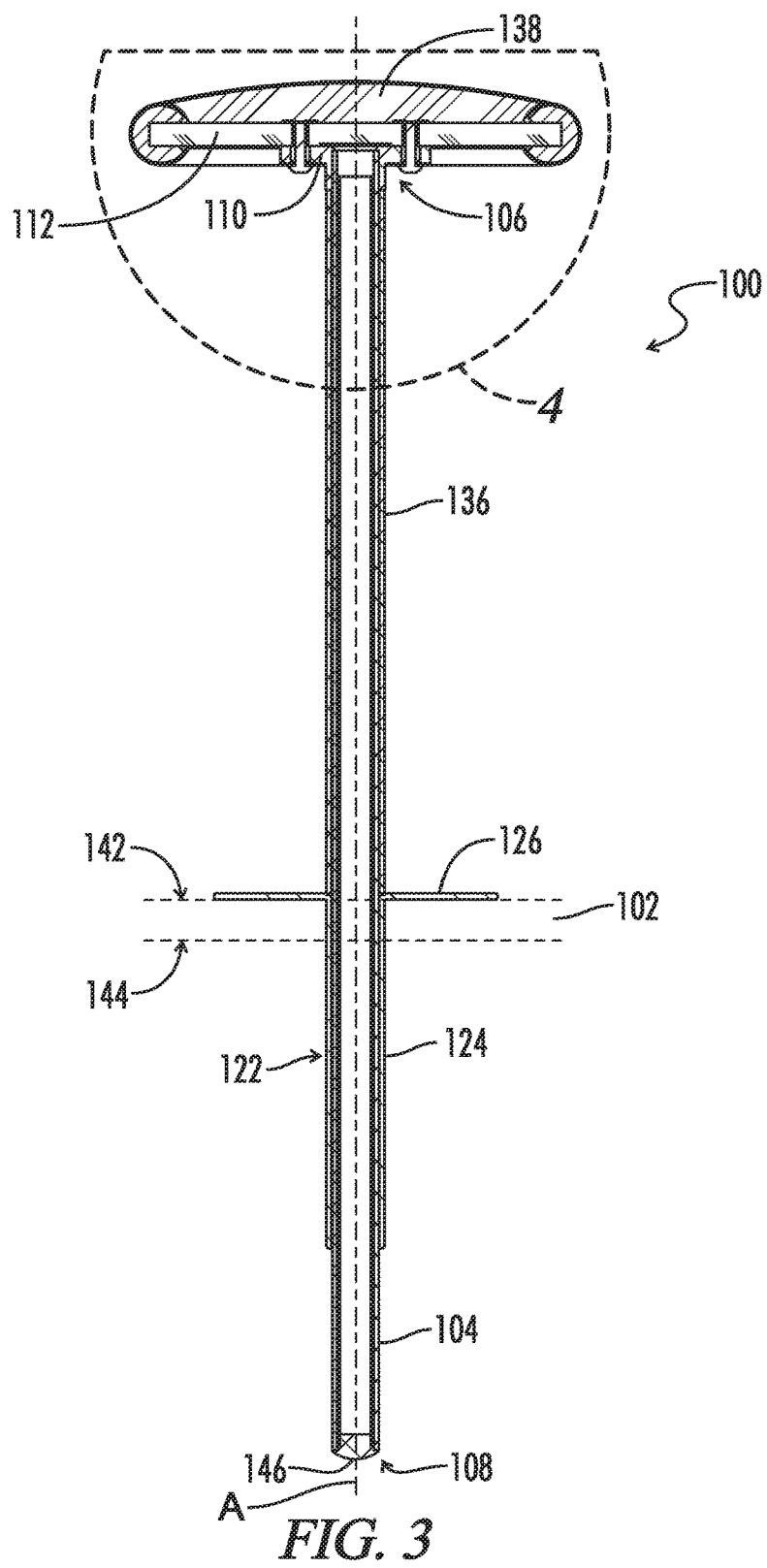
FIG. 3 is a side elevation cross-section view of the support frame of FIG. 1.
Figure 4:
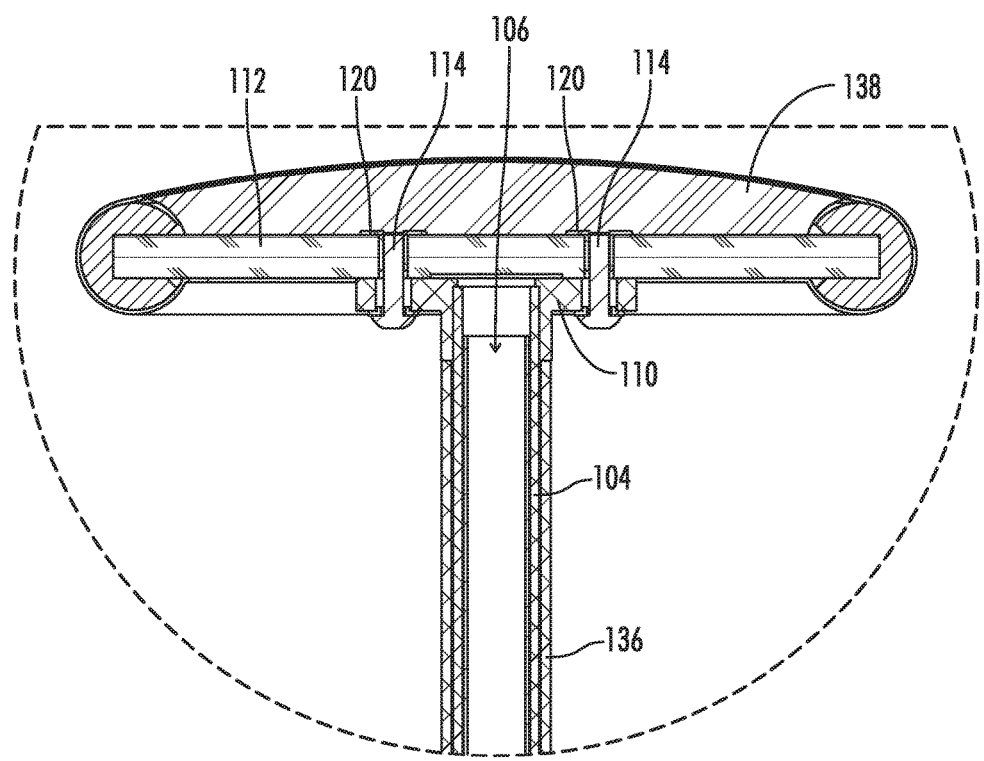
FIG. 4 is a detailed side elevation cross-section view of a portion of the support frame of FIG. 1.

Turning now to FIGS. 3 and 4, a support platen 112 may be connected to the platen bracket 110 with, in a non-limiting example, a plurality of bolts 114. As can best be seen in FIG. 9, the platen bracket 110 may include a plurality of non-threaded holes 116, and the support platen 112 may include corresponding holes 118 that are either threaded or non-threaded. In embodiments with non-threaded holes 118, the support frame 100 may further include a plurality of nuts 120 to receive the bolts 114. In some embodiments, one or more rotatable bearing plates may be positioned between the platen bracket 110 and the support platen 112, and facilitate rotation there between.

Figure 2:
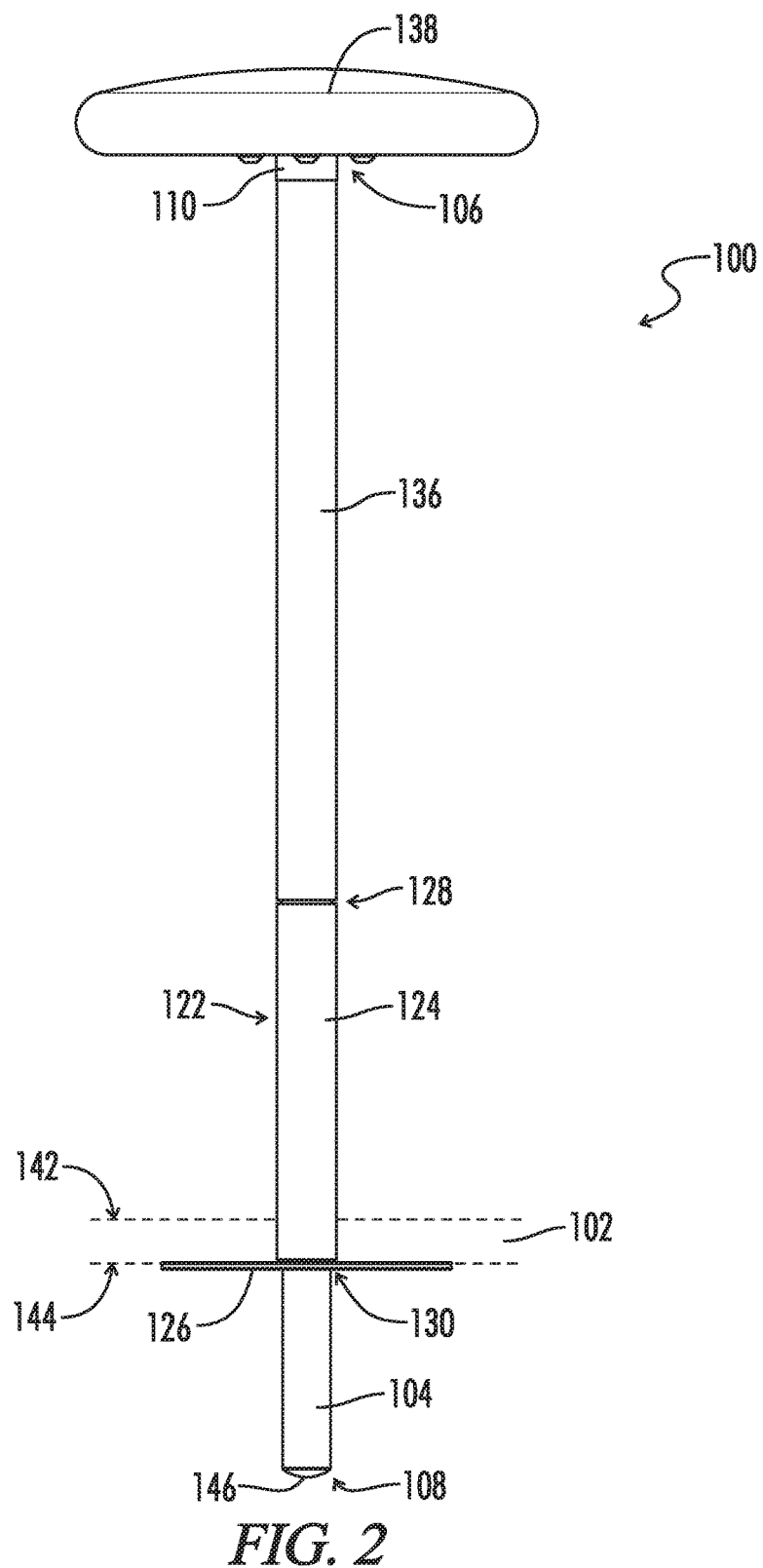
FIG. 2 is a side elevation view of the support frame of FIG. 1 in an alternate configuration.

As shown in FIGS. 1-3, the support frame 100 may further include a flanged sleeve 122 coaxially received on the elongate rigid column 104 nearer the distal end 108 than the proximal end 106. The flanged sleeve 122, shown in detail in FIGS. 5-7, may include a sleeve portion 124 slidably received on the elongate rigid column 104 along the longitudinal axis A of the support frame 100. The flanged sleeve 122 may also include a mounting flange 126 extending from the sleeve portion 124.

The mounting flange 126 may be configured to interface with the support platform 102. As shown in FIG. 5, the flanged sleeve 122 may further include a free end 128 and a flange end 130 opposite the free end. The mounting flange 126 may extend radially from the sleeve portion 124 nearer the flange end 130 than the free end 128. The mounting flange 126 may be of any appropriate size and shape. In one exemplary embodiment (shown in FIG. 6), the mounting flange 126 may be formed as a square when viewed from a direction along the longitudinal axis A when the support frame 100 is assembled. In another exemplary embodiment (shown in FIG. 7), the mounting flange 126 may be formed as a circle when viewed from a direction along the longitudinal axis A when the support frame 100 is assembled. The mounting flange 126 may also include a plurality of holes 132 configured to receive fasteners (not shown) there through. The holes 132 may be located in any appropriate location and may be of any appropriate number. The mounting flange 126 that is square (FIG. 6) may, for instance, include a hole 132 in each of the four corners of the face of the mounting flange. The mounting flange 126 that is circular (FIG. 7) may, for instance, include a plurality of holes 132 angularly spaced apart from each other along a circular line B that is coaxial with the outer circumference of the mounting flange.

Furthermore, some embodiments of the flanged sleeve 122 may include an axial passageway 133 defined in both the sleeve portion 124 and the mounting flange 126. In such embodiments, the elongate rigid column 104 may freely pass through the axial passageway 133 along a length of the sleeve portion 124 and potentially beyond the mounting flange 126.

Other embodiments utilizing the configuration shown in FIG. 2 may include the axial passageway 133 defined in only the sleeve portion 124 such that the mounting flange 126 acts as a stop against which the distal end 108 of the elongate rigid column 104 may rest. Alternatively, the mounting flange 126 may include a hole (not shown) that is smaller in diameter than the axial passageway 133 in the sleeve portion 124, such that air or any other fluid may escape the sleeve portion as the elongate rigid column 104 is inserted therein. In some embodiments, one or more washers, spacers, cushions, any combination thereof, or the like (made of any appropriate material) may be provided in the axial passageway 133 against the mounting flange 126 such that the distal end 108 of the elongate rigid column 104 does not rest directly on the surface of the mounting flange when the elongate rigid column is positioned to extend far enough to otherwise rest on the mounting flange.

Alternative embodiments utilizing the configuration shown in FIG. 1 may instead include the axial passageway 133 extending through the mounting flange 126 and a majority of the sleeve portion 124 of the flanged sleeve 122 such that a stop (either a smaller diameter hole or an end wall) may be positioned nearer the free end 128 of the flanged sleeve than the flange end 130. Some embodiments may include one or more washers, spacers, cushions, any combination thereof, or the like (made of any appropriate material) provided in the axial passageway 133 against end wall (with or without the smaller diameter hole).

Figure 8:
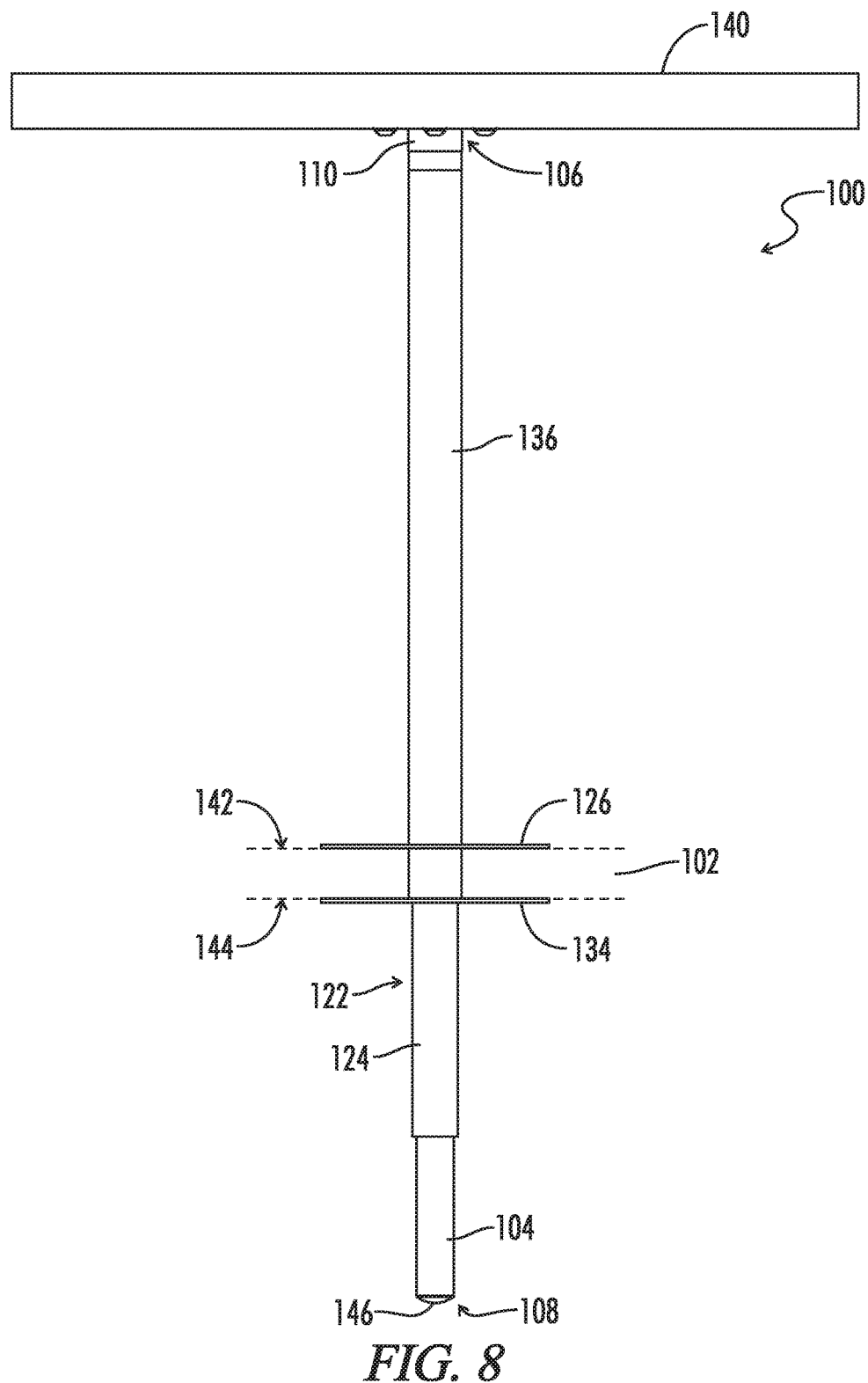
FIG. 8 is a side elevation view of the support frame of FIG. 1 including a table top (instead of the seat) and backing plate.

Turning to FIG. 8, the support frame 100 may also include a backing plate 134 configured to be located on the support platform 102 opposite the mounting flange 126. The backing plate 134 may be a similar shape as the mounting flange 126 and may include a plurality of holes (not shown) that correspond to the holes 132 in the mounting flange such that fasteners (not shown) may extend through the holes in the mounting flange, through the support platform 102, and through the holes in the backing plate.

Returning to FIGS. 1-3, the support frame 100 may further include a guide sleeve 136 coaxially received on the elongate rigid column 104 between the platen bracket 110 and the flanged sleeve 122. The guide sleeve 136 may be configured to maintain the platen bracket 110 and the flanged sleeve 122 in a spaced apart orientation when the support frame 100 is mounted to the corresponding support platform 102. The guide sleeve 136 may also be arranged to resist a force to move the proximal end 106 of the elongate rigid column 104 toward the support platform 102. In such embodiments, the guide sleeve 136 may function as a rigid spacer between the platen bracket 110 and the flanged sleeve 122.

In some embodiments, the guide sleeve 136 and the flanged sleeve 122 may include cylindrical sleeves with common inner and outer diameters such that the sleeves may both be received on the elongate rigid column 104 in a similar fit and may also have flush or substantially similar exterior appearance on the elongate rigid column. The guide sleeve 136 may also share a common outer diameter with a portion of the platen bracket 110 and may have a flush or substantially similar exterior appearance.

In some embodiments, the guide sleeve 136 may include one or more resilient members (not shown) such as springs, hydraulic cylinders, and the like. In such embodiments, the guide sleeve 136 may function to provide a cushion-like feel to a user when the user sits on the support frame 100.

Some embodiments may not include the guide sleeve 136 at all, particularly the embodiments discussed above including the mounting flange 126 acting as a stop to prevent the distal end 108 of the elongate support column 104 from extending beyond the surface of the mounting flange or the stop positioned nearer the free end 128 of the flanged sleeve 122 than the flange end 130. In such embodiments, the flanged sleeve 122 may provide all the required support to prevent the support frame 100 from tipping or lowering.

The support frame 100 may also be configured to be arranged in one or more orientations. In a first orientation (shown in FIG. 1), the flanged sleeve 122 may be received on the elongate rigid column 104 with the flange end 130 of the flanged sleeve nearer the proximal end 106 of the elongate rigid column than the free end 128 of the flanged sleeve. In a second orientation (shown in FIG. 2), the flanged sleeve 122 may be received on the elongate rigid column 104 with the free end 128 of the flanged sleeve nearer the proximal end 106 of the elongate rigid column than the flange end 130 of the flanged sleeve. A user may choose between the two orientations in order to alter the height of the support frame 100 when mounted to the support platform 102. A user may also choose between the two orientations to aid in avoiding potential difficulty in mounting the support frame 100 to the support platform 102 with a given one of the two orientations.

The support frame 100 may also include a seat (or seat cushion) 138 connected to the support platen 112. In such an embodiment, a user may use the support frame 100 as a bar stool or the like. The support frame 100 may alternatively include a table platform (or table top) 140 connected to the support platen 112, as shown in FIG. 8. Such an embodiment may allow a user to utilize the support frame 100 as an island table or high top table.

Figure 9:
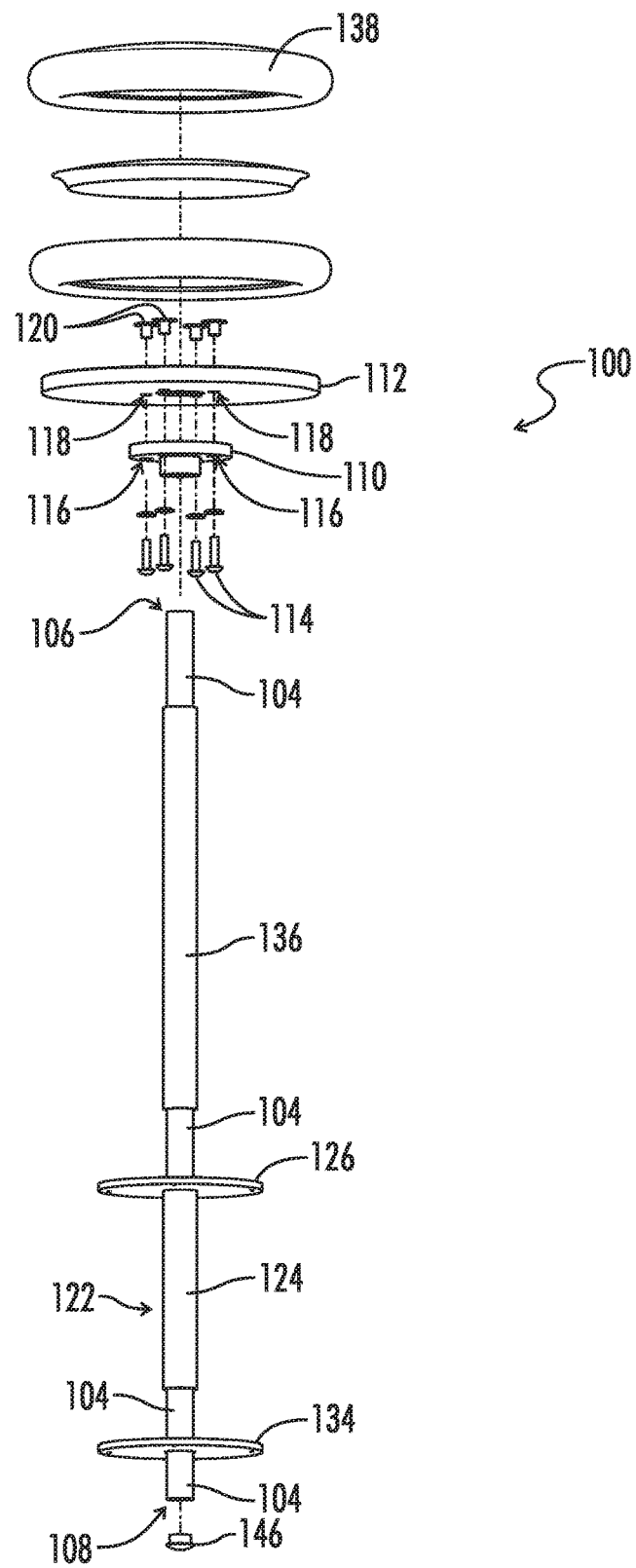
FIG. 9 is a perspective exploded view of the support frame of FIG. 1.

As can best be seen in FIG. 9, the support frame 100 may further include a plug, or end cap, 146 disposed within the elongate rigid column 104 nearer the distal end 108 than the proximal end 106 of the elongate rigid column. The end cap 146 may be sized to form a frictional interference fit within the elongate rigid column 104 and may prevent the passage of contaminants and/or moisture into the elongate rigid column. In additional or alternative embodiments, the end cap 146 may be joined to the elongate rigid column 104 by one or more adhesives, or may be integrally bonded thereto. In alternative embodiments, the support frame 100 may include a solid elongate rigid column 104, thereby eliminating the possibility of contaminants or moisture entering the elongate rigid column.

Figure 10:
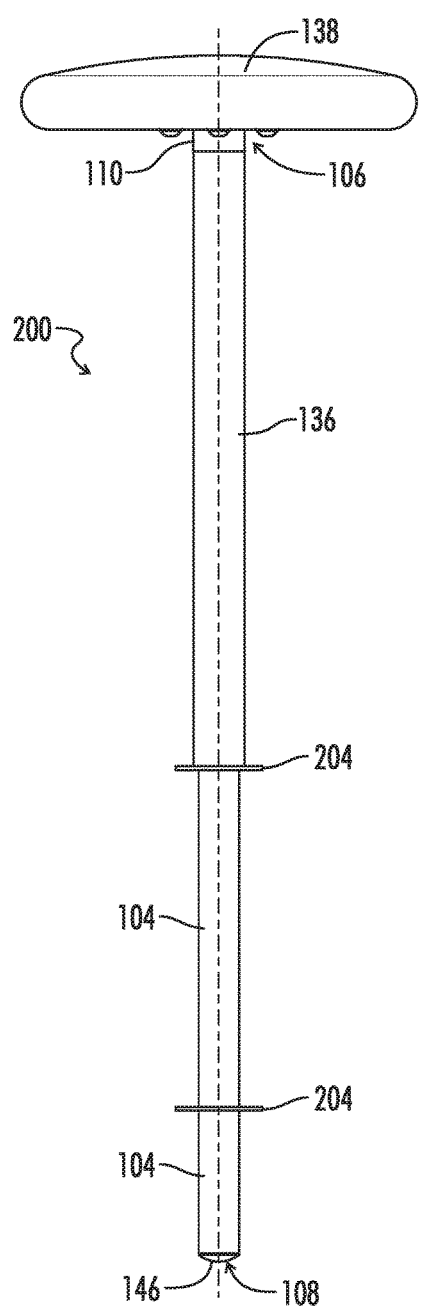
FIG. 10 is a side elevation view of another embodiment of a support frame.
Figure 11:
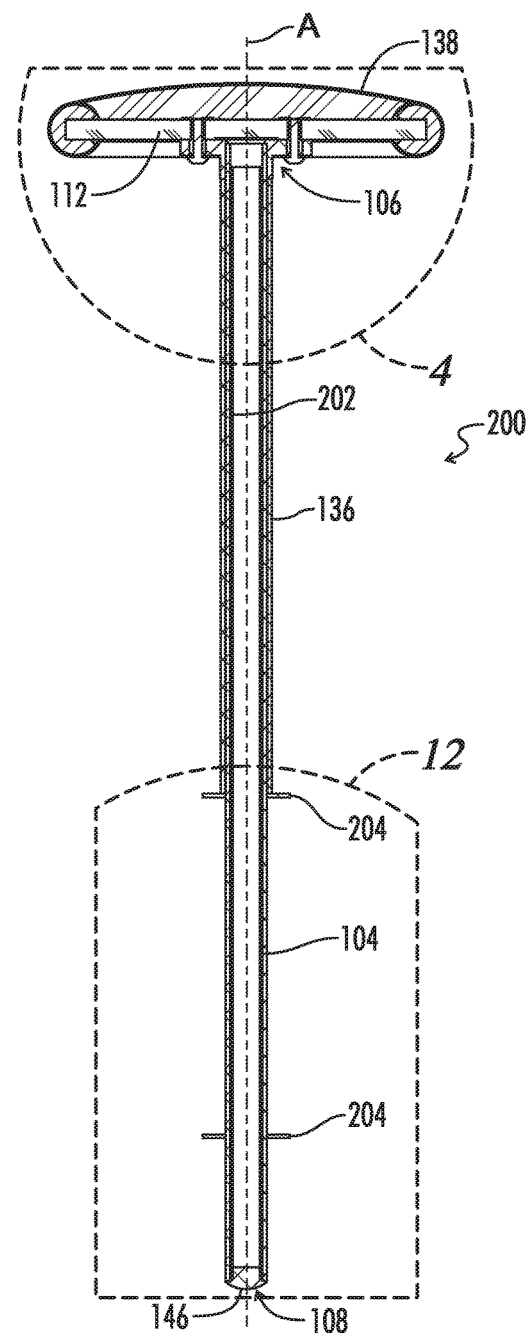
FIG. 11 is a side elevation cross-section view of the support frame of FIG. 10.
Figure 12:
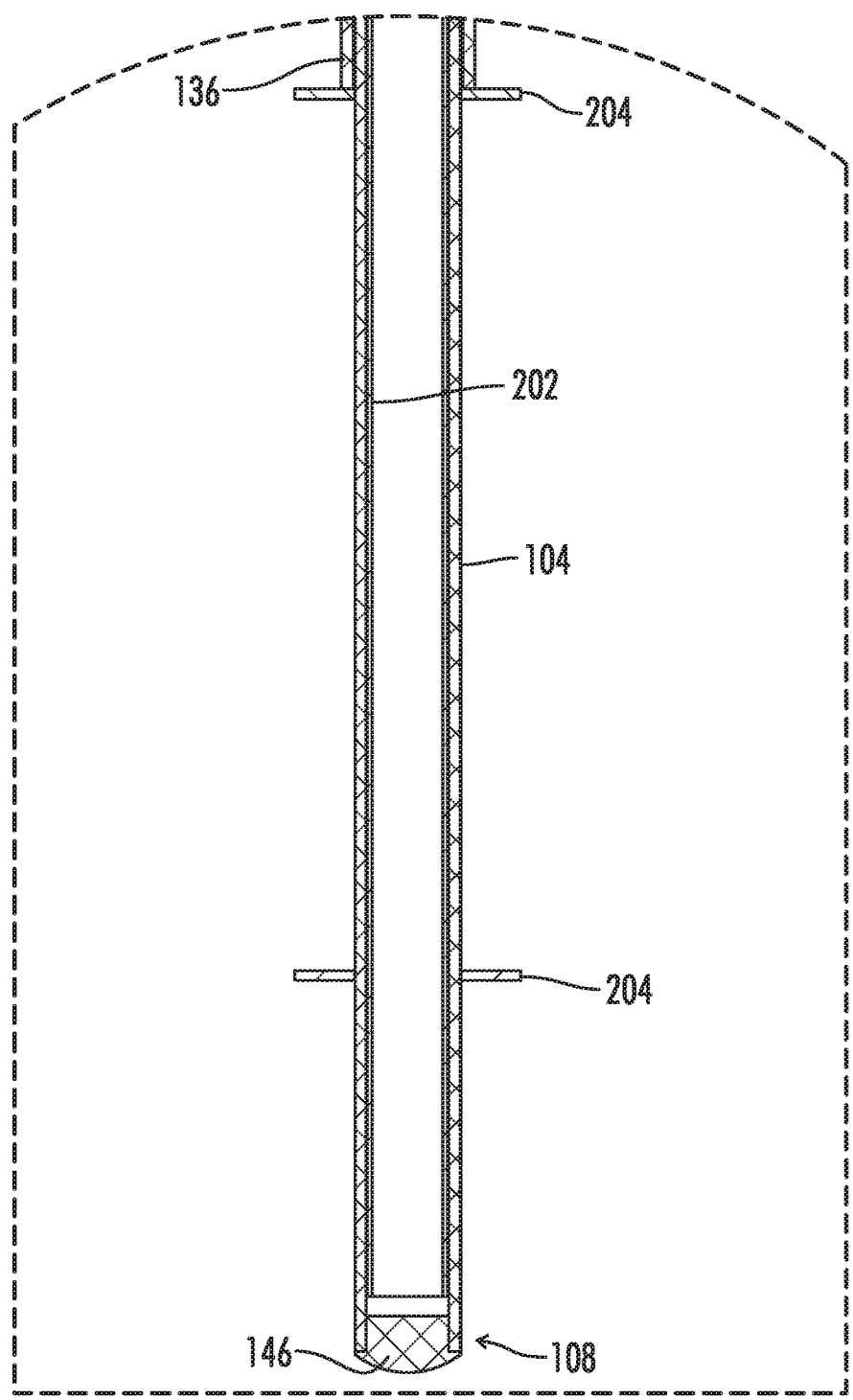
FIG. 12 is a detailed side elevation cross-section view of a portion of the support frame of FIG. 10.
Figure 13:
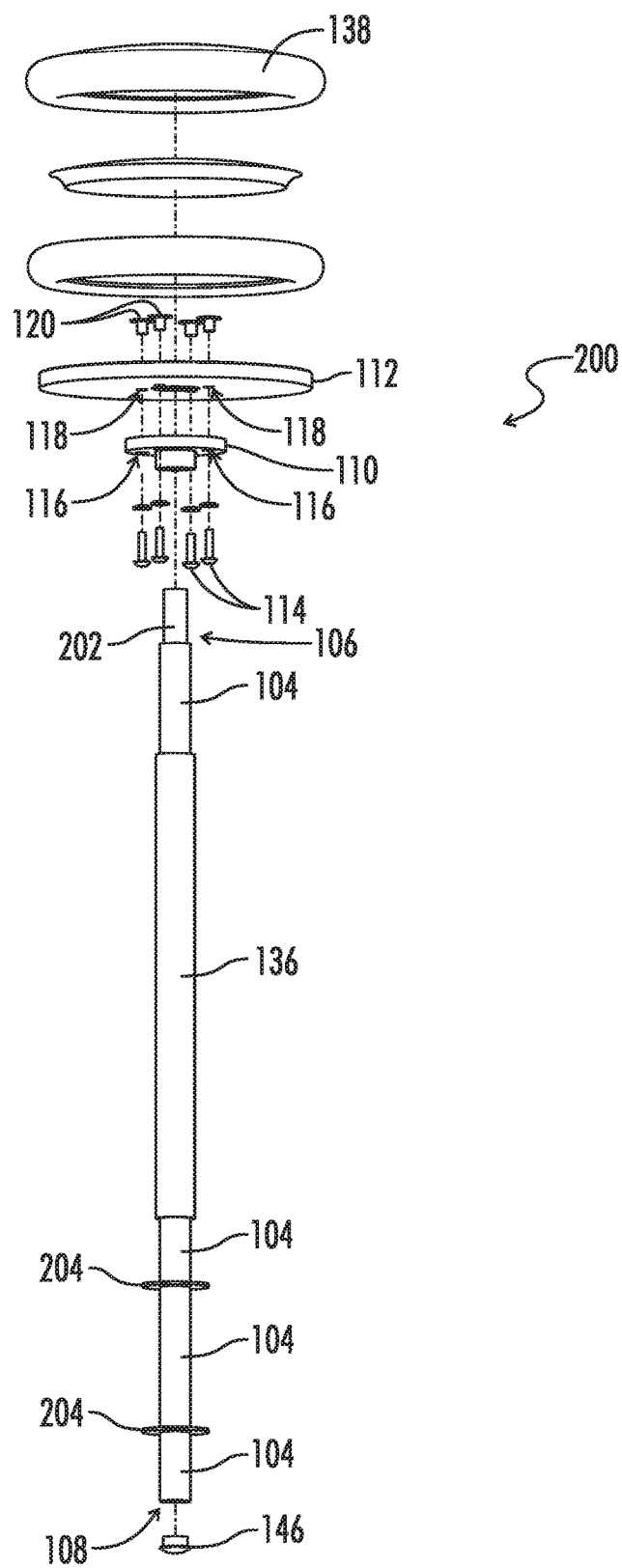
FIG. 13 is a perspective exploded view of the support frame of FIG. 10.

Turning to FIGS. 10 and 11, another embodiment of a support frame 200 is illustrated. As shown, the embodiment includes an elongate rigid column 104 extending along a longitudinal axis A from a proximal end 106 to a distal end 108. Disposed within the elongate rigid column 104 is a central rod 202. In some embodiments, the central rod 202 may be concentric with the elongate rigid column 104 and joined thereto. In other embodiments, the central rod 202 may be concentric with the elongate rigid column 104, but slidably disposed therein. Still other embodiments may omit the central rod 202.

Figure 14:
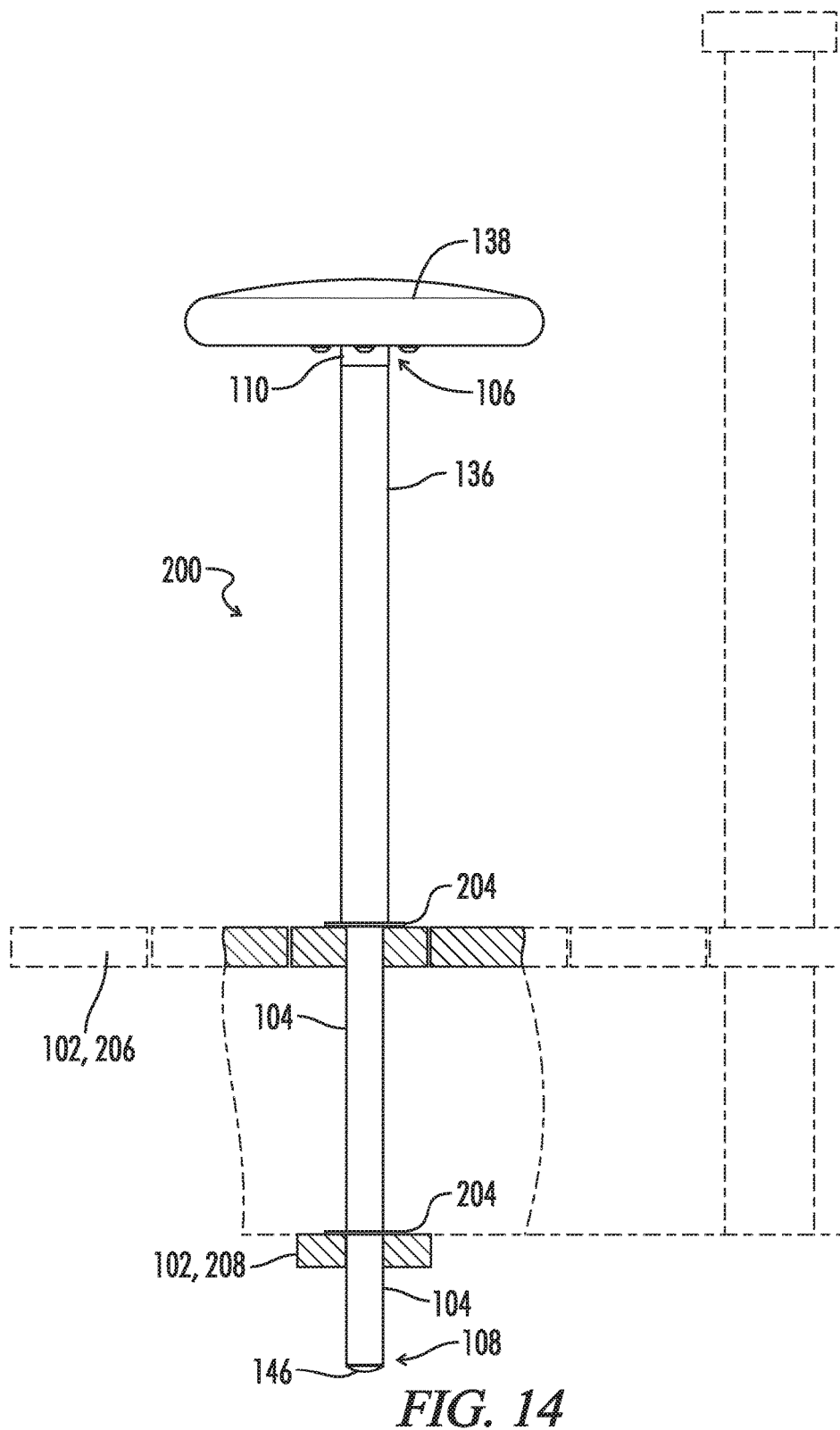
FIG. 14 is a side elevation view of the support frame of FIG. 10 mounted to a corresponding support platform.

One or more radial flanges 204 may be positioned about the elongate rigid column 104. Each flange 204 may be attached to the elongate rigid column 104 and provide vertically or horizontally-directed support when mounted. Moreover, each flange 204 may be joined to one or more support platforms 102 such as, for example, that of a deck platform 206 and/or a joist 208, as shown in FIG. 14.

In certain embodiments, the radial flange 204 may be fixedly or selectively attached to the elongate rigid column 104. When installed, the elongate rigid column 104 will extend through a central passage defined by the radial flange 204. The radial flange 204 may include a unitary (i.e., continuous) body, as shown in FIGS. 18 and 19. Alternatively, the flange 204 may be composed of a plurality of discrete body segments 210, 212 as shown in FIGS. 20 and 21.

In embodiments of the radial flange 204 including a plurality of discrete body segments 210, 212, the body segments may selectively attach to the elongate rigid column 104. In the exemplary embodiment of FIGS. 20 and 21, a first body segment 210 and a second body segment 212 are rotatably fixed to a clamp pin 214. As a result, the segments 210, 212 may selectively assume a clamped state (FIG. 20) and an unclamped state (FIG. 21). During installation, the segments 210, 212 may be positioned about the elongate rigid column 104 in an unclamped state. Once the radial flange 204 has been placed in a desired position on the elongate rigid column 104, the segments 210, 212 may be moved into a clamped state, thereby securing the radial flange to the elongate rigid column. The segments 210, 212 may remain in the clamped state by a threshold resistance to pivotal movement about the clamp pin 214. Alternatively or additionally, the segments 210, 212 may include hooks, pins, or some other joining feature such that the ends opposite the clamp pin 214 may be secured to each other. Still other embodiments may simply allow for a user to weld or otherwise permanently affix the segments 210, 212 in a clamped state once the radial flange 204 has been placed in the desired position. When a unitary or multi-segment radial flange 204 is attached to the elongate rigid column 104, each flange may serve to distribute the weight of the support frame 200, and any vertical force applied thereto, across a larger surface area.

In some embodiments, the radial flange 204 may be slidably disposed about the elongate rigid column 104. In such embodiments, the elongate rigid column 104 may freely move in a longitudinal direction through each respective radial flange 204. The flange 204 may provide support in a horizontal direction and prevent rotation of the elongate rigid column 104 about a horizontal axis.

Optionally, a plurality of radial flanges 204 may be provided. In such embodiments, the radial flanges 204 may be positioned parallel to each other in order to engage similarly-aligned support platforms 102 (as shown in FIG. 14) or opposing faces thereof. In certain embodiments having a plurality of radial flanges 204, a first flange 216 and a second flange 218 may be provided. If the flanges 216, 218 are selectively attached to the elongate rigid column 104, the passages 220, 222 defined by each flange (shown in FIGS. 18 and 19) may be sized and shaped to complement respective abutting portions of the exterior surface of the elongate rigid column 104. Moreover, the size and shape of the passages 220, 222 may be chosen according to the desired vertical position of the elongate rigid column 104 relative to the flanges 216, 218. For instance, in an exemplary embodiment, the passage 222 of the second flange 218 may have a diameter smaller than that of the passage 220 in the first flange 216. A portion of the elongate rigid column 104 nearer the distal end 108 than the proximal end 106 may thereby pass freely through the passage 220 of the first flange 216, but be substantially restricted from passing through the passage 222 of the second flange 218.

Additionally or alternatively, the shape defined by each passage 220, 222 and corresponding respective abutting portions of the exterior surface of the elongate rigid column 104 may be varied in order to restrict the vertical positioning of the elongate rigid column. In such embodiments, the passage 220 of the first flange 216 may have a shape that is different from the passage 222 of the second flange 218. The corresponding respective abutting portions of the exterior surface of the elongate rigid column 104 may vary along the longitudinal axis A to match the respective passages 220, 222. In an exemplary embodiment, illustrated in FIGS. 18 and 19, the passage 220 of the first flange 216 may be shaped to define a circular opening, while the corresponding respective abutting portion of the exterior surface of the elongate rigid column 104 may be shaped to have a complementary cylindrical body, and the passage 222 of the second flange 218 may be shaped to define an octagonal opening, while the corresponding respective abutting portion of the exterior surface of the elongate rigid column may be shaped to have a complementary octagonal prism body. During installation, the octagonal prism shaped portion of the elongate rigid column 104 nearer the distal end 108 than the proximal end 106 may pass freely through the passage 220 of the first flange 216, but may be restricted by the correspondingly octagonal passage 222 of the second flange 218. The cylindrical shaped portion of the elongate rigid column 104 may be nearer the proximal end 106 than the octagonal prism shaped portion of the elongate rigid column and may be restricted by the correspondingly circular passage 220 of the first flange 216. In further embodiments, other shapes known to one of ordinary skill in the art may be chosen. It is understood that the size and shape of each passage may be altered without departing from the teachings of the present embodiment.

In further additional or alternative embodiments, at least one of the first and second radial flanges 216, 218 may define cylindrical threaded passages. The outer surface of the elongate rigid column 104 may include one or more corresponding threaded portions. When installing the elongate rigid column 104, the threaded portions may be rotated through the first radial flange 216 before being rotated through the second radial flange 218. The threaded passages may thereby allow selective vertical positioning of the elongate rigid column 104 relative to the support platform 102. In optional embodiments, the threaded passage of the second flange 218 may include a terminal thread that restricts insertion of the elongate rigid column 104 threaded portion beyond a predetermined vertical position.

Certain embodiments will further include one or more flange covers (not shown) that create a substantially flush or closed surface with the corresponding radial flange 204 when the elongate rigid column 104 is not inserted there through. The flange cover may selectively attach to the flange 204 via a frictional slip fit, threaded engagement, or other mechanical connection. Optional embodiments of the flange cover will include a lever fixedly or selectively attached to the flange 204 or support platform 102. In such embodiments, a spring may rotatably bias the flange cover upward into the flange passage.

Some embodiments of the support frame 200 will include a guide sleeve 136 disposed around or about the elongate rigid column 104. The guide sleeve 136 may have a uniform or variable thickness about a circumference thereof, and may generally be configured to provide an opposing support force with respect to transverse (downward) forces parallel to the longitudinal axis A of the column during use. In certain embodiments, the guide sleeve 136 will be concentric with the elongate rigid column 104. The guide sleeve 136 extends along the longitudinal axis A and covers at least a portion of the elongate rigid column 104. In optional embodiments, the guide sleeve 136 may be slidably disposed on the elongate rigid column 104. As a result, the guide sleeve 136 may be selectively moved along the longitudinal axis A. In other embodiments, the guide sleeve 136 may be joined to the elongate rigid column 104 by an adhesive or integrally bonded thereto. In further optional embodiments, one or more concentric bearing collars (not pictured) may be positioned between the elongate rigid column 104 and the guide sleeve 136, and facilitate rotation there between. Additional or alternative embodiments may include one or more bearing collars positioned between any other mutually concentric members.

As shown in FIG. 14, the guide sleeve 136 of some embodiments extends along the elongate rigid column 104 above the support platform 102. In such embodiments, the guide sleeve 136 may align with the collar of a platen bracket 110 at the elongate rigid column's proximal end 106. In the support frame 200, the opposite end of the guide sleeve 136 may engage the top face of the first radial flange 216.

Figure 17:
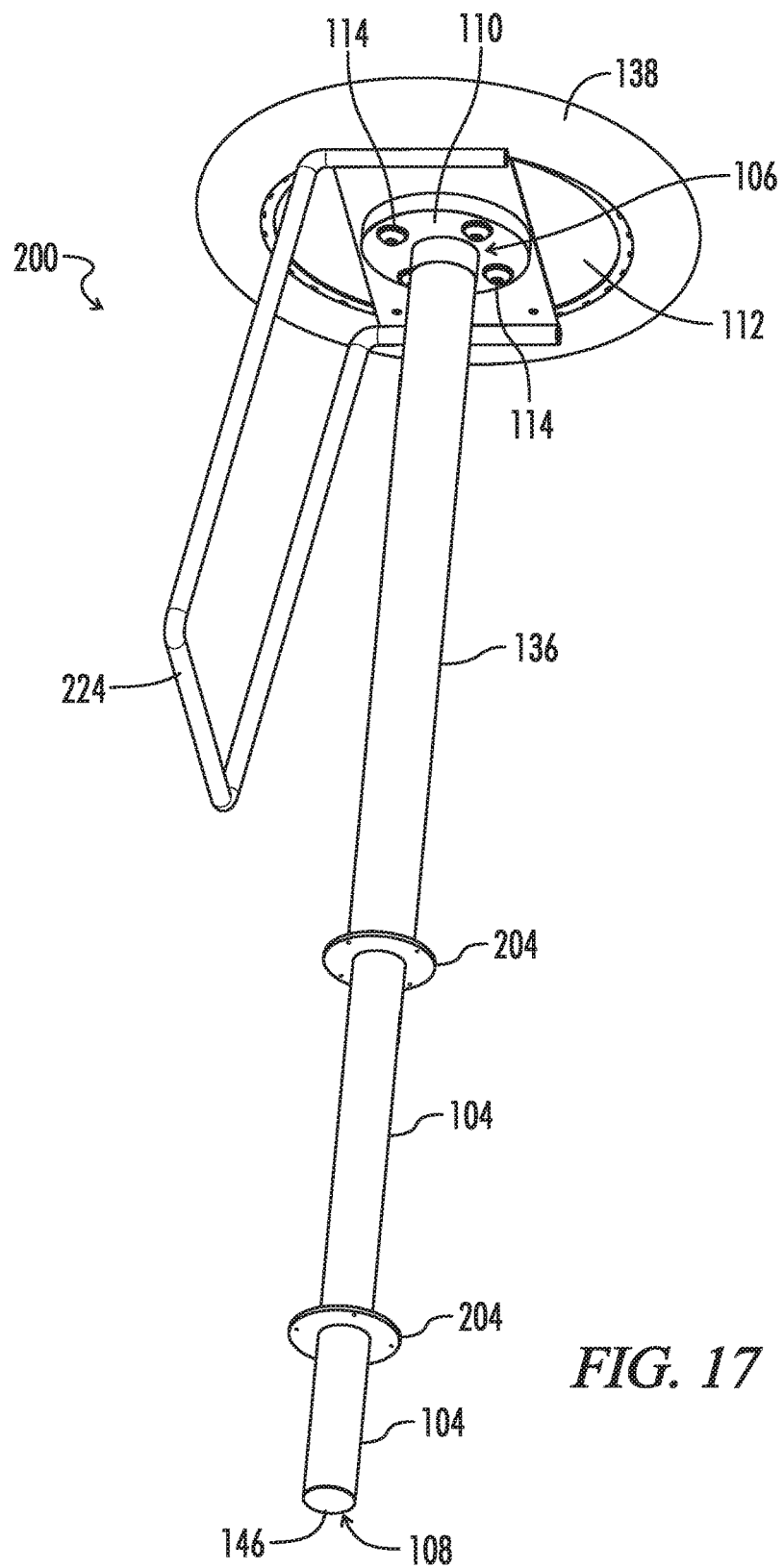
FIG. 17 is bottom perspective view of the support frame of FIG. 15.

Some embodiments of the support frame 200 may include a foot rest 224, as shown in FIGS. 15-17. In certain embodiments, the foot rest 224 may include a rigid protrusion extending from the support platen 112. The foot rest may be joined directly or indirectly to the support platen 112, the platen bracket 110, the guide sleeve 136, or another portion of the support frame 200.

FIG. 17 illustrates an embodiment of the support frame 200 wherein the foot rest is joined to the support platen 112 by the platen bracket 110. As shown, the platen bracket 110 may define one or more channels sized to receive one or more corresponding prongs of the foot rest 224. Optionally, the prongs of the foot rest 224 may be slightly larger than the corresponding channels, thereby forming an interference friction fit. In additional or alternative embodiments of the support frame 200, the foot rest 224 may be joined to the platen bracket 110 by one or more adhesives, or be integrally bonded thereto. In further additional or alternative embodiments, the foot rest 224 may be joined to the platen bracket 110 by one or more bolts, screws, or other mechanical connections.

The present disclosure is also directed to a support frame 100, 200 including a support platform 102 defining a hole therein and including an upper support face 142 and a lower support face 144. The distal end 108 of the elongate rigid column 104 may be received through the hole defined in the support platform 102 and may extend beyond the lower face 144 of the support platform. At least one mounting flange 126, or radial flange 204, may be connected to the elongate rigid column 104 nearer the distal end 108 of the elongate rigid column than the proximal end 106 of the elongate rigid column. The mounting flange 126, or radial flange 204, may further be mounted to at least one of the upper face 142 of the support platform 102 and the lower face 144 of the support platform. In some embodiments, the mounting flange 126, or radial flange 204, may or may not include a flanged sleeve 122. Some embodiments may further include a backing plate 134 received on one of the upper face 142 of the support platform 102 and the lower face 144 of the support platform such that the backing plate is opposite the support platform from the mounting flange 126, or radial flange 204. In such embodiments, the backing plate 134 may be fastened to the mounting flange 126, or radial flange 204.

The present disclosure is further directed to a method of installing a support frame 100 on a support platform 102. The method may include inserting a sleeve portion 124 of a flanged sleeve 122 in a corresponding hole in the support platform 102 such that a mounting flange 126 extending from the sleeve portion contacts a face 142, 144 of the support platform. A user may then slide a guide sleeve 136 onto an elongate rigid column 104 of the support frame 100. Next, a user may insert a distal end 108 of the elongate rigid column 104 into the sleeve portion 124 of the flanged sleeve 122, thereby confining the guide sleeve 136 between the flanged sleeve and a proximal end 106 of the elongate rigid column. A user may further affix the flanged sleeve 122 to the support platform 102 with fasteners (not shown) received through corresponding holes 132 defined in the mounting flange 126. A user may further extend the fasteners (not shown) through the corresponding holes 132 in the mounting flange 126, through the support platform 102, and through corresponding holes in a backing plate 134, thereby compressing the support platform between the mounting flange and the backing plate. A user may also position the guide sleeve 136 such that it resists a force pushing the proximal end 106 of the elongate rigid column 104 toward the support platform 102. Finally, a user may further slidably remove the elongate rigid column 104 from the guide sleeve 136 and the flanged sleeve 122 to store the elongate rigid column and guide sleeve, thereby leaving the flanged sleeve mounted to the support platform 102.

This written description uses examples to disclose the invention and also to enable any person skilled in the art to practice the invention, including making and using any devices or systems. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, e.g., Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to," such as connected through another component or multiple components. Similarly, to the extent the term "attach" is used in the specification or claims, it is intended to mean not only "directly attached to," but also "indirectly attached to," such as attached through another component or multiple components.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Although embodiments of the disclosure have been described using specific terms, such description is for illustrative purposes only. The words used are words of description rather than limitation. It is to be understood that changes and variations may be made by those of ordinary skill in the art without departing from the spirit or the scope of the present disclosure, which is set forth in the following claims. In addition, it should be understood that aspects of the various embodiments may be interchanged in whole or in part. While specific uses for the subject matter of the disclosure have been exemplified, other uses are contemplated. Therefore, the spirit and scope of the appended claims should not be limited to the description of the versions contained herein.

What is claimed is:

1. A support frame to be mounted to at least first and second support platforms having respective holes defined therein, the support frame comprising:

an elongate rigid column having a longitudinal axis extending from a proximal end to a distal end opposite the proximal end, and configured to extend through each of the at least first and second support platforms via the respective holes;

a platen bracket connected to the elongate rigid column nearer the proximal end than the distal end;

a support platen connected to the platen bracket;

a first flange and a second flange positioned along the elongate rigid column nearer the distal end than the proximal end, the first flange having a first passage with a first diameter, the second flange having a second passage with a second diameter smaller than the first diameter, each of the first and second flanges extending around and transversely from the longitudinal axis of the elongate rigid column, and the first and second passages configured to complement respective abutting portions of an exterior surface of the elongate rigid column, wherein the first flange is configured to interface with the first support platform and the second flange is configured to interface with the second support platform.

2. The support platform of claim 1, further comprising:

a guide sleeve coaxially received on the elongate rigid column between the platen bracket and the first and second flanges, the guide sleeve configured to maintain the platen bracket and the first and second flanges in a spaced apart orientation when the support frame is mounted to the at least first and second support platforms.

3. The support frame of claim 2, wherein the guide sleeve includes a rigid cylindrical sleeve.

4. The support frame of claim 1, wherein the first and second flanges are fixedly attached to the elongate rigid column.

5. The support frame of claim 1, wherein the first and second flanges are selectively attached to the elongate rigid column.

6. The support frame of claim 5, wherein each of the first and second flanges comprise a plurality of discrete body segments rotatably fixed to a clamping device to selectively assume a clamped state and an unclamped state about the elongate rigid column.

7. The support frame of claim 1, wherein the first and second flanges are slidably disposed about the elongate rigid column.

8. The support frame of claim 1, wherein at least one of the first and second flanges comprises a cylindrical threaded passage, and the elongate rigid column includes at least one complementary threaded portion.

9. The support frame of claim 1, wherein the first and second flanges comprise a flanged sleeve having a flange end and a free end, further wherein the flanged sleeve is selectively mounted with respect to the elongate rigid column in a first orientation with the flange end nearer the proximal end of the elongate rigid column than the free end, or in a second orientation with the free end nearer the proximal end of the elongate rigid column than the flange end.

10. A support frame to be mounted to at least first and second support platforms having respective holes defined therein, the support frame comprising:

an elongate rigid column having a longitudinal axis extending from a proximal end to a distal end opposite the proximal end, and configured to extend through each of the at least first and second support platforms via the respective holes;

a platen bracket connected to the elongate rigid column nearer the proximal end than the distal end;
a support platen connected to the platen bracket;
a first flange and a second flange positioned along the elongate rigid column nearer the distal end than the proximal end, each of the first and second flanges extending around and transversely from the longitudinal axis of the elongate rigid column,
wherein at least one of the first and second flanges comprises a cylindrical threaded passage, and the elongate rigid column includes at least one complementary threaded portion,
wherein the first flange is configured to interface with the first support platform and the second flange is configured to interface with the second support platform.

11. The support platform of claim 10, further comprising:
a guide sleeve coaxially received on the elongate rigid column between the platen bracket and the first and second flanges, the guide sleeve configured to maintain the platen bracket and the first and second flanges in a spaced apart orientation when the support frame is mounted to the at least first and second support platforms.

12. The support frame of claim 10, wherein passages defined by each of the first and second flanges are configured to complement respective abutting portions of an exterior surface of the elongate rigid column.

13. The support frame of claim 12, wherein the first flange has a first passage with a first diameter, and the second flange has a second passage with a second diameter smaller than the first diameter.

14. The support frame of claim 12, wherein respective configurations of the passages for each of the plurality of flanges and for corresponding abutting portions of the elongate rigid column are varied along a longitudinal axis of the elongate rigid column, to restrict vertical positioning of the elongate rigid column.

15. A support frame to be mounted to at least first and second support platforms having respective holes defined therein, the support frame comprising:
an elongate rigid column having a longitudinal axis extending from a proximal end to a distal end opposite the proximal end, and configured to extend through each of the at least first and second support platforms via the respective holes;
a platen bracket connected to the elongate rigid column nearer the proximal end than the distal end;
a support platen connected to the platen bracket;
a first flange and a second flange positioned along the elongate rigid column nearer the distal end than the proximal end, each of the first and second flanges extending around and transversely from the longitudinal axis of the elongate rigid column,
wherein the first and second flanges comprise a flanged sleeve having a flange end and a free end, further wherein the flanged sleeve is selectively mounted with respect to the elongate rigid column in a first orientation with the flange end nearer the proximal end of the elongate rigid column than the free end, or in a second orientation with the free end nearer the proximal end of the elongate rigid column than the flange end,
wherein the first flange is configured to interface with the first support platform and the second flange is configured to interface with the second support platform.

16. The support platform of claim 15, further comprising:
a guide sleeve coaxially received on the elongate rigid column between the platen bracket and the first and second flanges, the guide sleeve configured to maintain the platen bracket and the first and second flanges in a spaced apart orientation when the support frame is mounted to the at least first and second support platforms.

17. The support frame of claim 16, wherein the guide sleeve includes a rigid cylindrical sleeve.

18. The support frame of claim 15, wherein the first flange has a first passage with a first diameter, and the second flange has a second passage with a second diameter smaller than the first diameter, the first and second passages configured to complement respective abutting portions of an exterior surface of the elongate rigid column.

19. The support frame of claim 15, wherein:
passages defined by each of the first and second flanges are configured to complement respective abutting portions of an exterior surface of the elongate rigid column, and
respective configurations of the passages for each of the first and second flanges and for corresponding abutting portions of the elongate rigid column are varied along a longitudinal axis of the elongate rigid column, to restrict vertical positioning of the elongate rigid column.

20. The support frame of claim 15, wherein at least one of the first and second flanges comprises a cylindrical threaded passage, and the elongate rigid column includes at least one complementary threaded portion.

\* \* \* \* \*